(12) United States Patent
Nakashima et al.

(10) Patent No.: US 12,435,232 B2
(45) Date of Patent: Oct. 7, 2025

(54) NONAQUEOUS INKJET INK COMPOSITION

(71) Applicant: SAKATA INX CORPORATION, Osaka (JP)

(72) Inventors: Okinori Nakashima, Osaka (JP); Yoshiyuki Aoki, Osaka (JP); Ryohei Miyake, Osaka (JP); Koki Ogasahara, Osaka (JP)

(73) Assignee: SAKATA INX CORPORATION, Osaka (JP)

( * ) Notice: Subject to any disclaimer, the term of this patent is extended or adjusted under 35 U.S.C. 154(b) by 860 days.

(21) Appl. No.: 17/766,211

(22) PCT Filed: Oct. 28, 2020

(86) PCT No.: PCT/JP2020/040528
§ 371 (c)(1),
(2) Date: Apr. 1, 2022

(87) PCT Pub. No.: WO2021/085511
PCT Pub. Date: May 6, 2021

(65) Prior Publication Data
US 2023/0046096 A1 Feb. 16, 2023

(30) Foreign Application Priority Data
Oct. 30, 2019 (JP) ................. 2019-197475

(51) Int. Cl.
C09D 11/36 (2014.01)
C09D 11/326 (2014.01)
C09D 11/40 (2014.01)

(52) U.S. Cl.
CPC ............ *C09D 11/36* (2013.01); *C09D 11/326* (2013.01); *C09D 11/40* (2013.01)

(58) Field of Classification Search
CPC ....... C09D 11/36; C09D 11/326; C09D 11/40; C09D 11/107; C09D 11/322; C09D 11/324; C09D 11/38
See application file for complete search history.

(56) References Cited

U.S. PATENT DOCUMENTS

| 2010/0105807 A1 | 4/2010 | Sugita et al. | |
| 2016/0194508 A1* | 7/2016 | Yodo | C09D 11/36 428/207 |
| 2019/0144694 A1 | 5/2019 | Nakashima et al. | |

FOREIGN PATENT DOCUMENTS

| CN | 101652437 A | 2/2010 |
| CN | 109071982 A | 12/2018 |
| JP | 2005023298 A | 1/2005 |
| JP | 2005200469 A | 7/2005 |
| JP | 2008248008 A | 10/2008 |
| JP | WO2007072804 A1 | 5/2009 |
| JP | 2013001810 A * | 1/2013 |
| JP | 2013189566 A | 9/2013 |
| JP | 2016155909 A | 9/2016 |
| JP | 2016160419 A | 9/2016 |
| JP | 2017031272 A | 2/2017 |
| JP | 2017218472 A | 12/2017 |
| JP | 2018095688 A | 6/2018 |
| WO | 2007072804 A1 | 6/2007 |
| WO | 2015020128 A1 | 2/2015 |
| WO | WO-2021095339 A1 * | 5/2021 |

OTHER PUBLICATIONS

English machine translation of WO-2021095339-A1 (Year: 2021).*
English machine translation of JP-2013001810-A (Year: 2013).*
"New Functional Composite Coatings", Ding Hao et al. pp. 153-154, National Defense Industrial Press, Inc, Sep. 30, 2007 (4 pages).
"Polymer Nanocomposites," Wang Chen et al. pp. 153-154, Northwest Technical University Press, Aug. 30, 2017 (4 pages).
"Win-Chuang De Gu Sai Alumina Alu C", Guangzhou Jing Yi New Material Co. http://jingyi22.51sole.com/companyproductdetail_97217416.htm, publication date Aug. 11, 2016 (2 pages).
A Third Office Action issued by the State Intellectual Property Office of China on Sep. 4, 2023, for Chinese counterpart application No. 202080069404.X (7 pages).
International Preliminary Report on Patentability, dated May 3, 2022, for corresponding international application PCT/JP2020/040528 (1 page).
Notification Concerning Transmittal of International Preliminary Report on Patentability, mailed May 12, 2022, for corresponding international application PCT/JP2020/040528 (1 page).
Notification of Transmittal of Translation of the International Preliminary Report on Patentability, mailed May 12, 2022, for corresponding international application PCT/JP2020/040528 (1 page).

(Continued)

*Primary Examiner* — Jennifer A Smith
*Assistant Examiner* — Jeffrey Eugene Barzach
(74) *Attorney, Agent, or Firm* — Law Office of Katsuhiro Arai

(57) ABSTRACT

An object is to provide a nonaqueous inkjet ink composition offering excellent solid filling property and anti-mottling property, as well as excellent ink stability, discharge stability, and scratch resistance, even when printed at high speed on printing targets whose printing face is constituted by a polyvinyl chloride, ethylene-vinyl acetate-based copolymer, or other vinyl-based polymer, etc. As a solution, a nonaqueous inkjet ink composition is provided that contains acrylic-based resin, organic coloring pigment and/or carbon black, alumina, pigment dispersant, and organic solvent, wherein the organic solvent comprises propylene carbonate, diethylene glycol dialkyl ether, and dipropylene glycol alkyl ether acetate, and alumina is contained by 5 to 30 parts by mass relative to 100 parts by mass representing the total of organic coloring pigment and carbon black.

3 Claims, No Drawings

(56) References Cited

OTHER PUBLICATIONS

Written Opinion of the International Searching Authority, mailed Jan. 19, 2021, for corresponding international application PCT/JP2020/040528 (3 page).
International Search Report (ISR) mailed Jan. 19, 2021, issued for International application No. PCT/JP2020/040528. (3 pages).
A First Office Action issued by the State Intellectual Property Office of China on Dec. 23, 2022, for Chinese counterpart application No. 202080069404.X (6 pages).

* cited by examiner

NONAQUEOUS INKJET INK COMPOSITION

CROSS-REFERENCE TO RELATED APPLICATIONS

This application is the U.S. National Phase under 35 U.S.C. § 371 of International Application PCT/JP2020/040528, filed Oct. 28, 2020, which claims priority to Japanese Patent Application No. JP2019-197475, filed Oct. 30, 2019. The International Application was published under PCT Article 21 (2) in a language other than English.

TECHNICAL FIELD

The present invention relates to a nonaqueous inkjet ink composition suitable for manufacturing large billboard ads, etc., whose printing face is primarily constituted by a vinyl chloride-based polymer or ethylene-vinyl acetate-based copolymer, as well as a printed matter obtained by using the same.

BACKGROUND ART

Recent billboard ads increasingly feature vivid, sophisticated design logos and patterns, as well as photographic images of exterior views of products or human faces. Additionally, in terms of billboard size, there are now quite a few large billboards that are intended to leave stronger impressions on the viewers. Traditionally, general methods for manufacturing billboard ads included cutting out colored sheets in the shapes of letters and pasting them for those featuring logos, and utilizing various types of printing presses for those featuring photographic images. This made manufacturing of billboard ads time-consuming and labor-intensive, and the need for printing presses and other large-scale equipment also presented challenges.

Accordingly, attempts are made to utilize the inkjet method, which allows a design created on a personal computer to be directly printed on a base material, in order to make manufacturing of billboards featuring vivid images easier.

One unique aspect of the inkjet method is that it accommodates a wide range of materials that can be utilized as base materials for printing, allowing printing on sheets of paper, polymer, metal, and other hard/soft materials with ease. Particularly for billboard ads that are installed outdoors, the performance requirements include being lightweight, exceptionally strong and durable, rain-resistant, and inexpensive; therefore, the ability to print on polymer sheets having these properties is a great advantage.

Additionally, super-wide-format inkjet printers boasting a printing width of over 2,000 mm have emerged of late, rendering billboard manufacturing much easier by, for example, making large printed matters that traditionally required pasting printable all at once.

In general, tarpaulin is a frequent choice as a polymer sheet used for billboard ads. It should be noted that tarpaulin is a composite sheet comprising polyester or polyamide as a core material, with a polyvinyl chloride, ethylene-vinyl acetate-based copolymer or other vinyl-based polymer layered on top and bottom thereof.

Among the inkjet ink compositions used for printing on these composite sheets are nonaqueous inkjet ink compositions based on organic solvents (environmentally-friendly organic solvents in recent years). Nonaqueous inkjet ink compositions must use materials having good wettability, drying property, fixing property, etc., on the polyvinyl chloride, ethylene-vinyl acetate-based copolymer, and other vinyl-based polymers being the top face materials of the composite sheets.

Accordingly, the art of utilizing an alkylene glycol monoether, monoester, or cyclic ester as an organic solvent (refer to Patent Literature 1), the art of using a vinyl-based polymer as a binder resin and, as an organic solvent, one that contains a specific amount of environmentally-friendly polyalkylene glycol dialkyl ether (refer to Patent Literature 2), and the art of containing specific amounts of diethylene glycol ethyl methyl ether and propylene carbonate as an organic solvent (refer to Patent Literature 3), are publicly known.

However, there has been a demand for higher printing speeds in recent years.

Also, in printing of conventional nonaqueous inkjet ink compositions (particularly nonaqueous inkjet ink compositions using environmentally-friendly organic solvents), improving the ink stability and fine print reproducibility while also addressing the insufficient filling of solid areas (hereinafter referred to as "solid filling property"), lower discharge stability, occurrence of mottling, and poor scratch resistance, has presented challenges.

BACKGROUND ART LITERATURE

Patent Literature

Patent Literature 1: Japanese Patent Laid-open No. 2005-200469
Patent Literature 2: International Patent Laid-open No. WO2007/072804
Patent Literature 3: International Patent Laid-open No. WO2015/020128
Patent Literature 4: Japanese Patent Laid-open No. 2017-31272

SUMMARY OF THE INVENTION

Problems to be Solved by the Invention

An object of the present invention is to provide a nonaqueous inkjet ink composition offering excellent solid filling property and anti-mottling property, as well as excellent ink stability, discharge stability, and scratch resistance, even when printed at high speed on printing targets whose printing face is constituted by a polyvinyl chloride, ethylene-vinyl acetate-based copolymer, or other vinyl-based polymer, etc.

Means for Solving the Problems

After studying in earnest to achieve the aforementioned object, the inventors of the present invention found that the aforementioned object could be achieved by using an organic solvent having a specific composition, and eventually completed the present invention.

To be specific, the present invention encompasses the following:

1. A nonaqueous inkjet ink composition containing acrylic-based resin, organic coloring pigment and/or carbon black, alumina, pigment dispersant, and organic solvent, wherein the organic solvent comprises propylene carbonate, diethylene glycol dialkyl ether, and dipropylene glycol alkyl ether acetate, and alumina is contained by 5 to 30 parts by mass relative to 100 parts by mass representing the total of organic coloring pigment and carbon black.
2. The nonaqueous inkjet ink composition according to 1, wherein the diethylene glycol dialkyl ether comprises diethylene glycol ethyl methyl ether and/or diethylene glycol diethyl ether.

Effects of the Invention

The nonaqueous inkjet ink composition proposed by the present invention contains constituents of specific compositions including acrylic-based resin, organic coloring pigment and/or carbon black, alumina, pigment dispersant, and organic solvent.

This way, it can demonstrate effects such as good scratch resistance, fine writing property, solid filling property, and anti-mottling property, as well as good discharge stability from inkjet printer nozzles.

Mode for Carrying Out the Invention (Acrylic-Based Resin)

The acrylic-based resin contained in the nonaqueous inkjet ink composition proposed by the present invention may be a polymer constituted by any (meth)acrylate that can dissolve in organic solvents, copolymer of such polymers, etc. Such (meth)acrylate may be, for example, ethyl, propyl, or butyl (meth)acrylate or other alkyl (meth)acrylate; hydroxymethyl, hydroxyethyl, hydroxypropyl, hydroxybutyl, hydroxypentyl (meth)acrylate or other hydroxyalkyl (meth)acrylate, etc.

Examples include BR-60 (Tg: 75° C.), BR-64 (Tg: 55° C.), BR-75 (Tg: 90° C.), BR-77 (Tg: 80° C.), BR-83 (Tg: 105° C.), BR-87 (Tg: 105° C.), BR-88 (Tg: 105° C.), BR-90 (Tg: 65° C.), BR-93 (Tg: 50° C.), BR-95 (Tg: 80° C.), BR-105 (Tg: 50° C.), BR-106 (Tg: 50° C.), BR-107 (Tg: 50° C.), BR-108 (Tg: 90° C.), BR-113 (Tg: 75° C.), BR-115 (Tg: 50° C.), and BR-116 (Tg: 50° C.) manufactured by Mitsubishi Chemical Corporation, and the like.

The content of acrylic-based resin relative to the total amount of nonaqueous inkjet ink composition is preferably 1.0 to 15.0% by mass, or more preferably 2.0 to 12.0% by mass, or yet more preferably 5.0 to 10.0% by mass.

If the total amount of acrylic-based resin used is under 1.0% by mass, the fixing property on the base material becomes insufficient; if the amount used exceeds 15.0% by mass, on the other hand, the solids content increases excessively, and the discharge stability drops as a result.

It should be noted that, to the extent that it does not reduce the performance, any resins other than the aforementioned acrylic-based resin, such as vinyl chloride-based resin, vinyl chloride-vinyl acetate-based resin, ethylene-vinyl acetate-based resin, styrene-acrylic-based resin, styrene-maleic acid-based resin, rosin-based resin, rosin ester-based resin, petroleum resin, cumarone indene-based resin, terpen phenol-based resin, phenol resin, urethane resin, melamine resin, urea resin, epoxy-based resin, cellulose-based resin, xylene resin, alkyd resin, aliphatic hydrocarbon resin, butyral resin, maleic acid resin, fumaric acid resin, etc., may also be combined.

(Organic Coloring Pigment)

For use as the organic coloring pigment contained in the nonaqueous inkjet ink composition proposed by the present invention, preferably one is selected from among the known organic coloring pigments traditionally used in nonaqueous inkjet ink compositions.

Specific examples of such organic coloring pigments include azo-based, azomethine-based, polyazo-based, phthalocyanine-based, quinacridone-based, anthraquinone-based, indigo-based, thioindigo-based, quinophthalone-based, benzimidazolone-based, isoindoline-based, isoindolinone-based, and other organic pigments, where specific examples as expressed by the color index include Pigment Black 7, Pigment Blue 15, 15:1, 15:3, 15:4, 15:6, 60, Pigment Green 7, 36, Pigment Red 9, 48, 49, 52, 53, 57, 97, 122, 149, 168, 177, 178, 179, 206, 207, 209, 242, 254, 255, Pigment Violet 19, 23, 29, 30, 37, 40, 50, Pigment Yellow 12, 13, 14, 17, 20, 24, 74, 83, 86, 93, 94, 95, 109, 110, 117, 120, 125, 128, 137, 138, 139, 147, 148, 150, 151, 154, 155, 166, 168, 180, 185, Pigment Orange 36, 43, 51, 55, 59, 61, 71, 74, and the like.

Preferably the content of organic coloring pigment in the ink composition proposed by the present invention is 1.0 to 10.0% by mass.

Carbon Black

Permitted for use in the ink composition proposed by the present invention is any carbon black traditionally used in inkjet printing; however, the scratch resistance and glossiness of obtained colored images tend to improve as the average primary particle size of the carbon black decreases, and therefore the carbon black should have an average primary particle size of preferably 15 to 40 nm, or more preferably 20 to 30 nm.

The average primary particle size of carbon black refers to the value obtained as follows. Specifically, a dispersion liquid constituted by chloroform in which the carbon black has been fully diluted and dispersed is prepared, where its concentration is such that, when images of carbon black agglomerates are micrographically captured with a transmission electron microscope (TEM), the images of agglomerates in the micrograph do not overlap one another. Next, it is spread on a collodion membrane mesh and dried, and then micrographically captured in this condition to obtain a TEM micrograph (magnification factor 30000× after enlarging). Then, the TEM micrograph is read with a scanner to digitize image signals that are then input to a computer to obtain the area of each agglomerate based on image analysis. Furthermore, the average area of a primary particle is obtained from the area of each agglomerate and the number of agglomerated primary particles, and the diameter of a circle having the same area is arithmetically considered the average particle size of a primary particle. Finally, the arithmetic average of the average particle sizes of primary particles representing all or a specific number of agglomerates is calculated as the average primary particle size.

Under the present invention, the content of carbon black, if contained, is 1 to 12% by mass, or preferably 2 to 6% by mass, relative to the total nonaqueous inkjet ink composition. If the content is under 1% by mass, the density of the obtained image becomes lower, while a content exceeding 6% by mass raises a concern that the discharge stability of the inkjet ink composition may drop.

Also, the carbon black used has a specific surface area of preferably 80 to 150 $m^2/g$, or more preferably 100 to 130 $m^2/g$. Keeping it in this range is particularly preferable in terms of scratch resistance, solid filling property, anti-mottling property, etc., of colored images.

Additionally, the carbon black used is preferably an acid carbon black, or more preferably one whose pH is 2.5 to 4.

The aforementioned specific surface area of carbon black indicates the specific surface area by nitrogen absorption as measured in accordance with JIS K6217, while the pH indicates the pH value as measured in accordance with JIS K6221.

The carbon black used under the present invention may be Mitsubishi Carbon Black MA7, MA77, MA8, MA11, MA100, or MA220, for example.

(Alumina)

Alumina is powder that can be used as pigments, and does not include other inorganic pigments whose surface is coated with alumina. Alumina whose surface is hydrophilic is preferred, where the average particle size of the alumina pigment is 10 to 150 nm, and although its shape may be either spherical or flat, a spherical shape is preferred in consideration of discharge property. The specific surface area is preferably 70 to 130 $m^2/g$, or more preferably 90 to 110 $m^2/g$.

It may have been surface-treated to make its surface hydrophilic or hydrophobic, but it may not have been surface-treated.

(Content of Organic Coloring Pigment and/or Carbon Black and Compounding Amount of Alumina)

Under the present invention, the alumina pigment is compounded preferably by 5 to 30 parts by mass, or more preferably by 8 to 25 parts by mass, or yet more preferably by 12 to 23 parts by mass, or most preferably by 15 to 20 parts by mass, relative to 100 parts by mass representing the total of organic coloring pigment and carbon black.

(Other Pigments)

Specific examples of other pigments that may be compounded in the nonaqueous inkjet ink composition proposed by the present invention include titanium oxide, zinc flower, zinc oxide, lithopone, iron oxide, silicon dioxide, kaolinite, montmorillonite, talc, barium sulfate, calcium carbonate, silica, cadmium red, red iron oxide, molybdenum red, chrome vermillion, molybdate orange, lead yellow, chrome yellow, cadmium yellow, yellow iron oxide, titanium yellow, chromium oxide, viridian, cobalt green, titanium cobalt green, cobalt chrome green, ultramarine, ultramarine blue, Prussian blue, cobalt blue, cerulean blue, manganese violet, cobalt violet, mica, etc.

Any one type of these pigments may be used alone, or two or more types may be combined to the extent that the effects of the present invention will not be impaired, where the amount used is 0.5 to 10.0% by mass, or more preferably 2.0 to 7.0% by mass, relative to the total amount of nonaqueous inkjet ink composition. If the amount of pigment used is less than 1.0% by mass, the coloring strength tends to be insufficient, while an amount exceeding 10.0% by mass tends to cause the viscosity to rise and ink fluidity to drop.

(Pigment Dispersant)

For the pigment dispersant contained in the nonaqueous inkjet ink composition proposed by the present invention, any ionic or nonionic surfactant or anionic, cationic or nonionic high-molecular compound may be used, for example.

In particular, those constituted by high-molecular compounds are preferred and, for example, the carbodiimide-based compounds described in Japanese Patent Laid-open No. 2004-083872, International Patent Laid-open No. WO2003/076527, and International Patent Laid-open No. WO2004/000950, AJISPER PB821 and 822 that are basic functional group-containing copolymers (manufactured by Ajinomoto Fine-Techno Co., Inc.) (acid value and amine value are both 10 to 20 mgKOH/g), SOLSPERSE 56000 (manufactured by Lubrizol Corporation), SOLSPERSE 39000 (manufactured by Lubrizol Corporation), DISPERBYK (manufactured by BYK-Chemie Japan K.K.), etc., are preferred. Any one type of these pigment dispersants may be used alone, or two or more types may be combined.

In particular, basic functional group-containing copolymers with an amine value of 10 to 40 mgKOH/g are preferred.

It should be noted that any of the aforementioned pigment dispersants may be selected and used as deemed appropriate according to the type of pigment and type of organic solvent used.

(Organic Solvent)

The organic solvent contained in the nonaqueous inkjet ink composition proposed by the present invention comprises propylene carbonate, diethylene glycol dialkyl ether, and dipropylene glycol alkyl ether acetate.

Furthermore, diethylene glycol dialkyl ether is used in such a way that its content relative to that of propylene carbonate, or "diethylene glycol dialkyl ether/propylene carbonate," is preferably 1.0 to 15.0, or more preferably 2.0 to 13.0, or yet more preferably 4.0 to 10.0, or most preferably 5.0 to 8.0.

By using diethylene glycol dialkyl ether and propylene carbonate in these ranges, excellent wettability, fixing property, and solid filling property can be achieved, along with excellent discharge stability, even in high-speed printing.

Also, preferably diethylene glycol dialkyl ether is used by 40.0 to 80.0% by mass in the nonaqueous inkjet ink composition, while propylene carbonate may be used preferably by 1.0 to 20.0% by mass, or more preferably by 3.0 to 18.0% by mass, or most preferably by 5.0 to 15.0% by mass from the viewpoint of further improving the printed image quality, in the nonaqueous inkjet ink composition.

Additionally, it is necessary that the nonaqueous inkjet ink composition contains dipropylene glycol alkyl ether acetate, where its content is 5.0 to 20.0% by mass, or preferably 8.0 to 15.0% by mass, or more preferably 8.0 to 13.0% by mass, or yet more preferably 9.0 to 12.0% by mass.

For the diethylene glycol dialkyl ether, preferably diethylene glycol ethyl methyl ether and/or diethylene glycol diethyl ether is/are used, or any other diethylene glycol dialkyl ether may also be combined.

For the dipropylene glycol alkyl ether acetate, preferably an alkyl group with 6 or fewer carbon atoms, or more preferably an alkyl group with 3 or fewer carbon atoms, or yet more preferably an alkyl group with 2 or fewer carbon atoms, may be adopted.

Also, besides diethylene glycol dialkyl ether, an alkylene glycol derivative with a flash point of 50 to 150° C. may also be combined in order to adjust the drying property and further improve the anti-mottling property.

Examples of such alkylene glycol derivatives with a flash point of 50 to 150° C. include, for example, triethylene glycol dimethyl ether, triethylene glycol diethyl ether, tetraethylene glycol dimethyl ether, and other (poly)ethylene glycol dialkyl ethers, propylene glycol dimethyl ether, propylene glycol diethyl ether, dipropylene glycol dimethyl ether, dipropylene glycol diethyl ether, tetrapropylene glycol diethyl ether, tetrapropylene glycol dimethyl ether, and other (poly)propylene glycol dialkyl ethers, propylene glycol monobutyl ether, dipropylene glycol monomethyl ether, dipropylene glycol monoethyl ether, and other (poly)propylene glycol monoalkyl ethers, propylene glycol monoethyl ether acetate, propylene glycol monobutyl ether acetate, dipropylene glycol monomethyl ether acetate, dipropylene glycol monoethyl ether acetate, dipropylene glycol monobutyl ether acetate, and other (poly)propylene glycol monoalkyl ether monoalkyl esters, ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, triethylene glycol monobutyl ether, tetraethylene glycol monobutyl ether, and other (poly)ethylene glycol monoalkyl ethers, ethylene glycol monomethyl ether acetate, ethylene glycol monoethyl ether acetate, ethylene glycol monobutyl ether acetate, diethylene glycol monomethyl ether acetate, triethylene glycol monomethyl ether acetate, and other (poly)ethylene glycol monoalkyl ether monoalkyl esters, ethylene glycol diacetate, diethylene glycol diacetate, triethylene glycol diacetate, and other (poly)ethylene glycol diesters, ethylene glycol monomethyl ether acetate, ethylene glycol monoethyl ether acetate, ethylene glycol monobutyl ether acetate, diethylene glycol monomethyl ether acetate, diethylene glycol monoethyl ether acetate, diethylene glycol monobutyl ether acetate, diethylene glycol monopropyl ether acetate, triethylene glycol monomethyl ether, triethylene glycol monoethyl ether acetate, triethylene glycol monobutyl ether acetate, and other (poly)ethylene glycol monoether monoesters.

Among the alkylene glycol derivatives with a flash point of 50 to 150° C., diethylene glycol ethyl methyl ether and diethylene glycol diethyl ether are called to attention first.

The content of the alkylene glycol derivative with a flash point of 50 to 150° C. in the nonaqueous inkjet ink composition is preferably 45.0 to 78.0% by mass, in particular, preferably 50.0 to 75.0% by mass.

Also, to the extent that it does not significantly change the flash point of the solvent as a whole, ethylene glycol diethyl ether, ethylene glycol dimethyl ether, propylene glycol monomethyl ether, propylene glycol monoethyl ether, propylene glycol monomethyl ether acetate, etc., whose flash point is not in a range of 50 to 150° C. may also be combined.

In addition, preferably the total amount of organic solvent accounts for 80.0 to 98.0% by mass in the total ink composition. If the aforementioned total amount exceeds 98.0% by mass, the printability of the obtained ink drops; if the total amount is under 80.0% by mass, on the other hand, a rise in the ink viscosity is induced and the discharge property of the ink from the nozzle tends to drop, which is not desired.

Also, an organic solvent with a boiling point of 180° C. or higher may or may not be contained. Furthermore, preferably water is not contained as a solvent.

(Other Components)

Furthermore, in the nonaqueous inkjet ink composition proposed by the present invention, various types of additives such as surfactant, plasticizer, surface conditioner, ultraviolet protective agent, photostabilizer, antioxidant, etc., may be used as necessary.

It should be noted that the ink composition proposed by the present invention is not a type curable with ultraviolet ray or other energy rays, and is also not intended for color filters.

(Manufacturing of Nonaqueous Inkjet Ink Composition)

Next, how the nonaqueous inkjet ink composition proposed by the present invention is manufactured using these materials is explained.

The nonaqueous inkjet ink composition proposed by the present invention can be obtained by, for example, dispersing and mixing the materials using a wet circulation mill, bead mill, ball mill, sand mill, attritor, roll mill, DCP mill, agitator, Henschel mixer, colloid mill, ultrasonic homogenizer, high-pressure homogenizer (Microfluidizer, Nanomizer, Ultimizer, Genus Py, DeBEE 2000, etc.), pearl mill, or other dispersion machine, and adjusting the viscosity of the nonaqueous inkjet ink composition to 2 to 10 mPa·s.

Preferably the content of all organic solvents in the nonaqueous inkjet ink composition proposed by the present invention, which is the total amount of ink composition less the total sum of the amounts of binder resin, pigment, pigment dispersant, and other additives that may be used as necessary, is changed as deemed appropriate so as to bring the ink viscosity into the aforementioned range.

The thus obtained nonaqueous inkjet ink composition proposed by the present invention can be used with inkjet printers on base materials whose top face layer at least is constituted by a vinyl chloride-based polymer or ethylene-vinyl acetate-based copolymer.

(Applications)

The nonaqueous inkjet ink composition proposed by the present invention can be used in known applications, among which it is particularly suited for situations where scratch resistance is required, and the ink composition is used on top face layers of nonabsorbent base materials. Nonabsorbent materials include metals, resins, ceramics, etc., but preferably the ink composition is used on top face layers of resin base materials, or more strictly on top face layers where this resin is constituted by a vinyl chloride-based polymer or ethylene-vinyl acetate-based copolymer, from the viewpoint of solid filling property, stickiness prevention, and other printing properties, etc.

EXAMPLES

The present invention is explained in greater detail below using examples; however, the present invention is not limited to these examples. It should be noted that, unless otherwise specified, "%" means "% by mass," while "part" means "part by mass."

The materials used in the Examples and Comparative Examples below are listed below. All components other than solvents are expressed in solids content.

In the table, the unit of values in the rows pertaining to pigments, dispersants, resin, solvents and total is "% by mass."

<Organic Pigments>
  G01 (LEVASCREEN Yellow G01 (P.Y. 150)) (manufactured by Lanxess AG)
  RGT (FASTOGEN Super Magenta RGT) (manufactured by DIC Corporation)
  D7110F (HELIOGEN Blue D7110F) (manufactured by BASF Japan Ltd.)
<Carbon Black>
  MA7 (Carbon Black MA7) (manufactured by Mitsubishi Chemical Corporation)
<Other Pigments>
  BARIFINE 20 (Barium Sulfate) (manufactured by Sakai Chemical Industry Co., Ltd.)
  BARIFINE 40 (Barium Sulfate) (manufactured by Sakai Chemical Industry Co., Ltd.)
<Alumina>
  AEROXIDE Alu C (manufactured by Nippon Aerosil Co., Ltd., average primary particle size 80 nm, specific surface area 100 $m^2/g$)
<Pigment Dispersants>
  PB822: AJISPER PB822 (manufactured by Ajinomoto Fine-Techno Co., Inc.)
  SOLSPERSE 56000 (manufactured by Lubrizol Corporation)
  SOLSPERSE 39000 (manufactured by Lubrizol Corporation)

<Resin>
BR-87: DIANAL BR-87 (manufactured by Mitsubishi Chemical Corporation, glass transition temperature 105° C., mass average molecular weight 25,000) (acrylic-based resin)

Examples 1 to 5 and Comparative Examples 1 to 4

<Manufacturing of Nonaqueous Inkjet Ink Compositions>

According to the recipes in Table 1 (compounding ratio of each material is based on % by mass), the respective materials were mixed under agitation to obtain the nonaqueous inkjet ink compositions in Examples 1 to 5 and Comparative Examples 1 to 4.

<Printing Method>

The nonaqueous inkjet ink compositions in Examples 1 to 5 and Comparative Examples 1 to 4 were loaded in a commercial inkjet printer and subjected to solid printing on polyvinyl chloride sheets in a high-speed printing mode, to obtain the printed matters in Examples 1 to 5 and Comparative Examples 1 to 4.

These printed matters were measured/evaluated for the properties below.

In the evaluations below, ratings A and B indicate levels suitable for practical use, while ratings C and D indicate levels that fall short for practical use.

(Viscosity)

The 25° C. viscosity of each of the nonaqueous inkjet ink compositions in Examples 1 to 5 and Comparative Examples 1 to 4 was measured using a viscometer (manufactured by Toki Sangyo Co., Ltd., model: RE100L).

(Scratch Resistance)

Each of the nonaqueous inkjet ink compositions in Examples 1 to 5 and Comparative Examples 1 to 4 was subjected to solid printing on a polyvinyl chloride sheet (product name: MD5, manufactured by METAMARK (UK) Ltd.) in a high-speed printing mode, and the coating film was rubbed 100 times with a bleached cloth under a load of 500 g using a Gakushin-type abrasion tester (manufactured by Daiei Kagaku Seiki Mfg. Co., Ltd.) to visually observe the degree of removal of the coating film, and the result was evaluated according to the criteria below:
  A: The coating film was not removed.
  B: The coating film was scratched at the surface.
  C: The coating film was somewhat removed.
  D: The coating film was noticeably removed.

(Fine Print Reproducibility)

The nonaqueous inkjet ink compositions in Examples 1 to 5 and Comparative Examples 1 to 4 were subjected to solid printing on polyvinyl chloride sheets (product name: MD5, manufactured by METAMARK (UK) Ltd.) in a high-speed printing mode, and the results were visually evaluated for degree of clarity of fine print (smudged characters, garbled characters).

Evaluation Criteria
  A: Not smudged nor garbled, and clear.
  B: Smudged and garbled, but legible.
  C: Smudged and garbled, and hardly legible.

(Solid Filling Property)

Each of the nonaqueous inkjet ink compositions in Examples 1 to 5 and Comparative Examples 1 to 4 was subjected to solid printing on a polyvinyl chloride sheet (product name: MPI 1000 Series, manufactured by Avery Dennison Corporation) in a high-speed printing mode, and the result was visually evaluated for filling of solid areas based on whether or not the images have voids, that is, if the solid areas are filled properly.

Evaluation Criteria
  A: There are no voids.
  B: There are some voids.
  C: There are many voids.

(Anti-Mottling Property)

Each of the nonaqueous inkjet ink compositions in Examples 1 to 5 and Comparative Examples 1 to 4 was subjected to solid printing in mixed colors (red, blue, green) on a polyvinyl chloride sheet (product name: MPI 1000 Series, manufactured by Avery Dennison Corporation) in a standard mode, and the result was visually evaluated for mottled images (blotchy patterns).

Evaluation Criteria
  A: Mottling did not occur.
  B: Slight mottling occurred.
  C: A lot of mottling occurred.

(Ink Stability)

Each of the nonaqueous inkjet ink compositions in Examples 1 to 5 and Comparative Examples 1 to 4 was stored in a glass screw-top bottle. The bottle was kept stationary for 7 days under a temperature condition of 60° C., while being evaluated visually for presence or absence of sediments.

Evaluation Criteria
  A: No sediments were found.
  B: Sediments were found after 3 days.
  C: Sediments were found after 1 day.

(Discharge Stability)

Each of the nonaqueous inkjet ink compositions in Examples 1 to 5 and Comparative Examples 1 to 4 was subjected to printing on polyvinyl chloride sheets (product name: MPI 1000 Series, manufactured by Avery Dennison Corporation), and the result was evaluated based on the number of sheets having unprinted areas.

Evaluation Criteria
  A: Unprinted areas occurred on or after the 71st sheet, or unprinted areas did not occur until the 100th sheet.
  B: Unprinted areas occurred on or between the 51st and 70th sheets.
  C: Unprinted areas occurred on or between the 31st and 50th sheets.
  D: Unprinted areas occurred on or before the 30th sheet.

TABLE 1

|  |  | Examples | | | | | Comparative Examples | | | |
|  |  | 1 | 2 | 3 | 4 | 5 | 1 | 2 | 3 | 4 |
| --- | --- | --- | --- | --- | --- | --- | --- | --- | --- | --- |
| Organic pigments | G01 | 3.00 | 3.00 |  |  |  | 3.00 | 3.00 | 3.00 | 3.00 |
|  | RGT |  |  | 3.00 |  |  |  |  |  |  |
|  | D7110F |  |  |  | 3.00 |  |  |  |  |  |

TABLE 1-continued

|  |  | Examples | | | | | Comparative Examples | | | |
| --- | --- | --- | --- | --- | --- | --- | --- | --- | --- | --- |
|  |  | 1 | 2 | 3 | 4 | 5 | 1 | 2 | 3 | 4 |
| Carbon black | MA7 |  |  |  |  | 3.50 |  |  |  |  |
| Pigment dispersants | PB822 | 1.44 | 1.32 | 1.44 | 0.24 | 0.24 | 1.20 | 1.44 | 1.44 | 1.68 |
|  | SOLSPERSE 56000 |  |  |  | 1.20 |  |  |  |  |  |
|  | SOLSPERSE 39000 |  |  |  |  | 1.40 |  |  |  |  |
| Alumina | AEROXIDE Alu C | 0.60 | 0.30 | 0.60 | 0.60 | 0.60 |  |  |  | 1.20 |
| Barium sulfates | BARIFINE 20 |  |  |  |  |  |  | 0.60 |  |  |
|  | BARIFINE 40 |  |  |  |  |  |  |  | 0.60 |  |
| Resin | BR-87 | 8.00 | 8.00 | 8.00 | 9.00 | 9.00 | 8.00 | 8.00 | 8.00 | 8.00 |
| Organic solvents | Diethylene glycol diethyl ether | 36.96 | 37.38 | 36.96 | 35.96 | 35.26 | 37.80 | 36.96 | 36.96 | 36.12 |
|  | Diethylene glycol ethyl methyl ether | 30.00 | 30.00 | 30.00 | 30.00 | 30.00 | 30.00 | 30.00 | 30.00 | 30.00 |
|  | Propylene carbonate | 10.00 | 10.00 | 10.00 | 10.00 | 10.00 | 10.00 | 10.00 | 10.00 | 10.00 |
|  | Dipropylene glycol methyl ether acetate | 10.00 | 10.00 | 10.00 | 10.00 | 10.00 | 10.00 | 10.00 | 10.00 | 10.00 |
| Total |  | 100.00 | 100.00 | 100.00 | 100.00 | 100.00 | 100.00 | 100.00 | 100.00 | 100.00 |
| Viscosity (mPa · s) |  | 6.0 | 6.0 | 6.0 | 6.0 | 6.0 | 6.0 | 6.0 | 6.0 | 6.0 |
| Scratch resistance |  | A | B | A | A | A | C | B | B | A |
| Fine writing property |  | A | A | A | A | A | A | A | A | A |
| Solid filling property |  | A | A | A | A | A | A | A | A | A |
| Anti-mottling property |  | A | A | A | A | A | A | A | A | A |
| Ink stability |  | A | A | A | A | A | A | C | C | C |
| Discharge stability |  | A | A | A | A | A | A | A | A | A |

Examples 1 to 5 conforming to the present invention demonstrated excellent scratch resistance, fine writing property, solid filling property, anti-mottling property, ink stability, and discharge stability. In particular, Examples 1 and 3 to 5 received rating A for all of the above because their dispersant contents were appropriate. Example 2 received B only for scratch resistance. By contrast, Comparative Example 1, which did not contain alumina pigment, led to deterioration in scratch resistance. Comparative Examples 2 and 3, in which barium sulfate was compounded in place of alumina pigment, showed deterioration in scratch resistance and ink stability. Comparative Example 4, which contained a higher level of dispersant, exhibited deterioration in ink stability.

What is claimed:

1. A nonaqueous inkjet ink composition containing acrylic-based resin, organic coloring pigment and/or carbon black, alumina, pigment dispersant, and organic solvent, wherein:
   the organic solvent comprises propylene carbonate, diethylene glycol dialkyl ether, and dipropylene glycol alkyl ether acetate; and
   alumina is contained by 5 to 30 parts by mass relative to 100 parts by mass representing a total of organic coloring pigment and carbon black.

2. The nonaqueous inkjet ink composition according to claim 1, wherein the diethylene glycol dialkyl ether comprises diethylene glycol ethyl methyl ether and/or diethylene glycol diethyl ether.

3. The nonaqueous inkjet ink composition according to claim 1, wherein a mass ratio of diethylene glycol dialkyl ether to propylene carbonate is 1.0 to 15.0.

* * * * *